(12) United States Patent
Yu et al.

(10) Patent No.: US 8,340,522 B2
(45) Date of Patent: Dec. 25, 2012

(54) FILTER ASSEMBLY AND OPTICAL MODULE USING SAME

(75) Inventors: Juhyun Yu, Hitachi (JP); Ryuta Takahashi, Hitachi (JP); Noribumi Kobayashi, Kitaibaraki (JP); Seiji Maruo, Hitachi (JP); Hiroki Katayama, Hitachi (JP); Yuuki Naganuma, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 632 days.

(21) Appl. No.: 12/016,295

(22) Filed: Jan. 18, 2008

(65) Prior Publication Data

US 2008/0175591 A1    Jul. 24, 2008

(30) Foreign Application Priority Data

Jan. 19, 2007  (JP) ................. 2007-010389

(51) Int. Cl.
*H04B 10/24* (2006.01)
*H04J 14/00* (2006.01)
*H04J 14/06* (2006.01)
*H04J 14/02* (2006.01)

(52) U.S. Cl. ............... 398/85; 398/41; 398/42; 398/43; 398/65; 398/79; 398/82; 398/83; 398/84; 398/86; 398/87; 398/88

(58) Field of Classification Search .............. None
See application file for complete search history.

(56) References Cited

U.S. PATENT DOCUMENTS

| | | | | |
|---|---|---|---|---|
| 5,920,411 A * | 7/1999 | Duck et al. | .......... | 398/85 |
| 6,198,864 B1 * | 3/2001 | Lemoff et al. | .......... | 385/47 |
| 6,396,978 B1 * | 5/2002 | Grann | .......... | 385/24 |
| 6,542,671 B1 * | 4/2003 | Ma et al. | .......... | 385/47 |
| 6,591,035 B2 * | 7/2003 | Miller et al. | .......... | 385/24 |
| 6,684,010 B1 * | 1/2004 | Morris et al. | .......... | 385/39 |
| 6,769,816 B2 * | 8/2004 | Capewell et al. | .......... | 385/89 |
| 6,775,439 B2 * | 8/2004 | Takano et al. | .......... | 385/47 |
| 2002/0126935 A1 * | 9/2002 | Krol et al. | .......... | 385/11 |

(Continued)

FOREIGN PATENT DOCUMENTS

JP    61-103109    5/1986

(Continued)

OTHER PUBLICATIONS

Office Action issued in Japanese Patent Application No. 2007-010389 on Apr. 26, 2001.

(Continued)

*Primary Examiner* — Kenneth N Vanderpuye
*Assistant Examiner* — Darren E Wolf
(74) *Attorney, Agent, or Firm* — Antonelli, Terry, Stout & Kraus, LLP.

(57) ABSTRACT

There is provided a filter assembly for combining a wavelength multiplexed optical signal by multiplexing optical signals of different wavelength emitted from respective optical devices, and/or for dividing a wavelength multiplexed optical signal into optical signals of different wavelength and causing the optical signals of different wavelength to enter respective optical devices. This filter assembly comprises: a light transmitting member within which each optical signal propagates; plural optical filters disposed on an upper face of the light transmitting member at a predetermined spacing wherein each optical signal passes through the optical filters; upper reflective layers respectively provided between adjacent ones of the optical filters; and a lower reflective layer provided on a lower face of the light transmitting member, and wherein the wavelength multiplexed optical signal propagates along the same optical path within the light transmitting member.

11 Claims, 8 Drawing Sheets

U.S. PATENT DOCUMENTS

2003/0152113 A1* 8/2003 Kropp ........................... 370/535
2003/0190126 A1 10/2003 Toyoshima et al.

FOREIGN PATENT DOCUMENTS

| JP | 61-219924 | 9/1986 |
| JP | 2002-072010 | 3/2002 |
| JP | 2002-296458 | 10/2002 |
| JP | 2004-534280 | 11/2004 |
| JP | 2005-17811 | 1/2005 |
| JP | 2005-140960 | 6/2005 |
| WO | WO 03/007049 | 1/2003 |

OTHER PUBLICATIONS

Office Action issued in Japanese Patent Application No. 2007-010389 on Sep. 27, 2011.

* cited by examiner (a)

(b)

(a)

(b)

FILTER ASSEMBLY AND OPTICAL MODULE USING SAME

CLAIM OF PRIORITY

The present application claims priority from Japanese application serial no. 2007-10389 filed on Jan. 19, 2007, the content of which is hereby incorporated by reference into this application.

BACKGROUND OF THE INVENTION

1. Field of the Invention

The present invention relates to filter assemblies and optical modules for use, e.g., in optical transceivers for transmitting gigabit Ethernet (registered trademark) signals.

2. Description of Related Art

In recent years, the Internet has become established as a communication infrastructure regardless of the type of information such as data, audio and video; hence it has attracted various businesses and is still continuing to expand its versatility. With this advance, the available bandwidths (i.e., communication capacity) are also continually on the rise. Among high-speed computer networking technologies, the Ethernet (registered trademark) is low cost and easy to manage, and is thereby in wide spread use as a core technology for a home LAN, a WAN, etc.

In this trend, the 10 Gigabit Ethernet (registered trademark) has already been standardized, and various companies have developed networking devices for use in it. Following this, optical transceivers have begun to be upgraded from 1 Gigabit Ethernet compatible to 10 Gigabit Ethernet compatible mainly in the field of intermediate-area networks.

Such optical transceivers include LX4 optical transceivers for four-channel wavelength division multiplexing (WDM) systems using four long-wavelength semiconductor laser diodes (LDs). The LX4 optical transceivers comprise a base, plural optical devices and plural optical filters in which: the base includes the plural optical devices and filters; the plural optical devices emit or receive optical signals of different wavelength; and the plural optical filters multiplex plural optical signals of different wavelength into a wavelength multiplexed optical signal or divide a wavelength multiplexed optical signal into plural optical signals of different wavelength.

Particularly, an optical module which mounts, on a base, semiconductor laser diodes (LDs) serving as optical devices and plural optical filters serving as an optical multiplexer is called a transmitting optical sub-assembly (TOSA). While, an optical module which mounts, on a base, photodiodes (PDs) serving as optical devices and plural optical filters serving as an optical demultiplexer is called a receiving optical sub-assembly (ROSA). Conventionally, plural edge filters are used as the optical filters, and are individually and independently mounted on a filter mount of a base while being positionally adjusted (aligned along the optical axis).

For example, JP-A-2005-140960 discloses an optical device having a cylindrical casing in which five edge filters serving as wavelength selection means are substantially equally spaced on the casing, along respective optical paths within the casing, and in front of respective ones of five light receiving means provided outside the casing, as most clearly shown in the first figure of JP-A-2005-140960. Also, JP-A-2002-72010 discloses an optical device, which has a multi-layer film filter with a continuously varying thickness across its surface, and a wavelength multiplexed optical signal is obliquely incident on the filter of the optical device to separate the optical signal.

As described above, in conventional methods of mounting optical filters to an optical transmission assembly, plural edge filters are individually and independently mounted thereto so as to provide a wavelength multiplexing function. Such conventional methods have many problems. For example, such optical filters require relatively many operations for assembling, and they are prone to misalign with the optical axis after alignment when the ambient temperature changes, thereby causing variation in the optical output power level.

In conventional methods of mounting optical filters to an optical receiving assembly, a single integrated Can package capable of accommodating all the plural PDs may be used, but a PD used in a general-purpose Can-package can not be applied in such a custom-made integrated package, resulting in an increase in the cost of optical receiving assemblies and optical transceivers. Although a PD array may be used as the plural PDs, in this case it is difficult to form a compact optical filter unit, thus incurring an increase in the size of optical receiving assemblies and therefore optical transceivers. There is another problem in that conventional optical transceivers have a relatively large number of parts to be managed because a separate individual optical filter is needed for each wavelength.

In the case of the filter assembly formed of a laminated multi-layer optical film filter described in the above-mentioned JP-A-2002-72010, general-purpose Can-packaged PD can not be used because of the small pitch between adjacent exits of wavelength separated optical signals, thus causing an increase in the entire cost of the assembly. Further, the incident angle of a wavelength multiplexed optical signal on the filter assembly is limited, thus reducing the design flexibility of the base and optical assembly.

SUMMARY OF THE INVENTION

Under these circumstances, the present invention is originated to solve the above problems. It is an object of the present invention to provide a high reliability and low cost filter assembly, and to provide an optical module using it.

(1) According to one aspect of the present invention, a filter assembly for combining a wavelength multiplexed optical signal by multiplexing optical signals of different wavelength emitted from respective optical devices, and/or for dividing a wavelength multiplexed optical signal into optical signals of different wavelength and causing the optical signals of different wavelength to enter respective optical devices, in which the filter assembly comprises: a light transmitting member within which each optical signal propagates; a plurality of optical filters disposed on an upper face of the light transmitting member at a predetermined spacing wherein each optical signal passes through the plurality of optical filters; upper reflective layers respectively provided between adjacent ones of the optical filters; and a lower reflective layer provided on a lower face of the light transmitting member, and wherein the wavelength multiplexed optical signal propagates along the same optical path within the light transmitting member.

In the above invention (1), the following modifications and changes can be made.

(i) The filter assembly further comprises a plurality of glass blocks, wherein respective ones of the plurality of glass blocks are provided between the upper face of the light transmitting member and the optical filter so as to cover spaces respectively defined between adjacent ones of the upper reflective layers.

(ii) The filter assembly further comprises a plurality of grooves each for forming an optical signal path oriented in a direction of the in-line optical filters, wherein the plurality of grooves are provided on the lower face of the light transmitting member and are provided below respective ones of the optical filters; and wherein the plurality of grooves of the lower face of the light transmitting member are covered with the lower reflective layer.

(iii) The filter assembly further comprises a half mirror for transmitting part of the wavelength multiplexed optical signal, wherein the half mirror is disposed at a portion of the lower reflective layer as a replacement on which the wavelength multiplexed optical signal after multiplexing or before demultiplexing is incident.

(iv) There are two optical paths formed in parallel in the light transmitting member: one optical path being for wavelength multiplexing; and the other optical path being for wavelength demultiplexing.

(v) The two parallel optical paths are formed side by side: an optical path for wavelength multiplexing formed on one side of the light transmitting member in its thickness direction; and an optical path for wavelength separation formed on the other side thereof, and each optical filter and each reflective layer are provided across both the optical paths.

(vi) The filter assembly further comprises a P or S polarizing plate respectively for transmitting P-polarized or S-polarized light contained in the wavelength multiplexed optical signal, wherein the P or S polarizing plate is provided at the upper face of the light transmitting member on which the wavelength multiplexed optical signal is incident.

(vii) An optical module which includes optical devices for converting an electrical signal into an optical signal and/or optical devices for converting an optical signal into an electrical signal, in which the optical module comprises the filter assembly according to an aspect of the present invention.

ADVANTAGES OF THE INVENTION

The present invention provides a filter assembly and an optical module using it, which can realize a high reliability and be manufactured at a low cost.

DETAILED DESCRIPTION OF THE PREFERRED EMBODIMENTS

Preferred embodiments according to the present invention will be described below with reference to the accompanying drawings. However, the present invention is not limited to the embodiments described herein.

First Embodiment of the Invention (Overall Structure of Optical Module)

At first, an optical module using a filter assembly according to a first preferred embodiment of the present invention will be described with reference to FIGS. 3 and 4.

Figure 3:
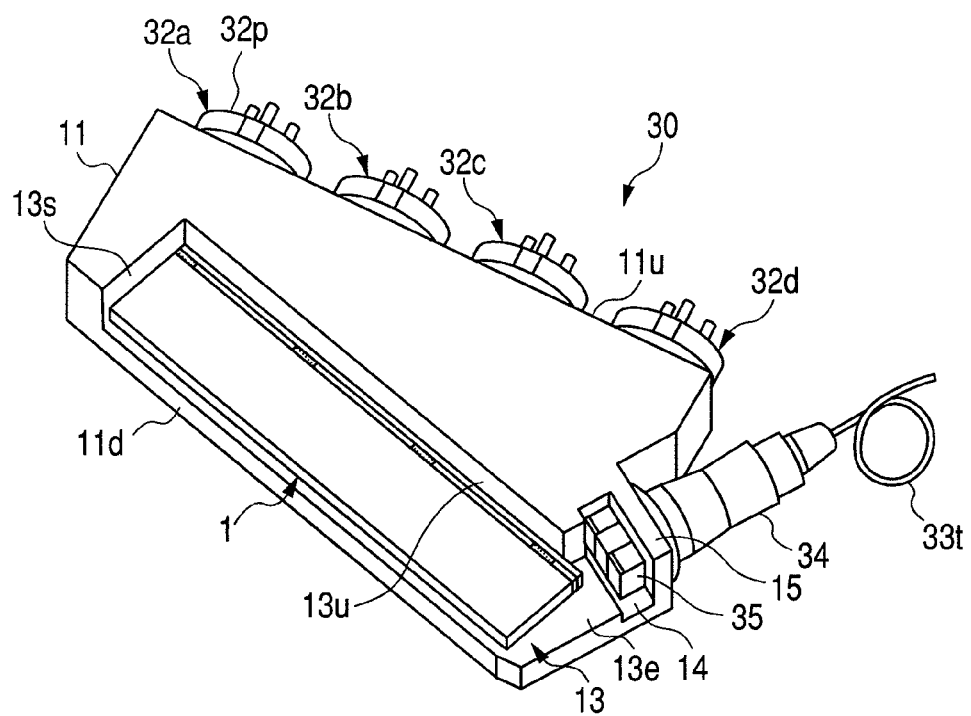
FIG. 3 is a schematic illustration showing a perspective view of an optical module comprising the filter assembly of FIG. 1.
Figure 4:
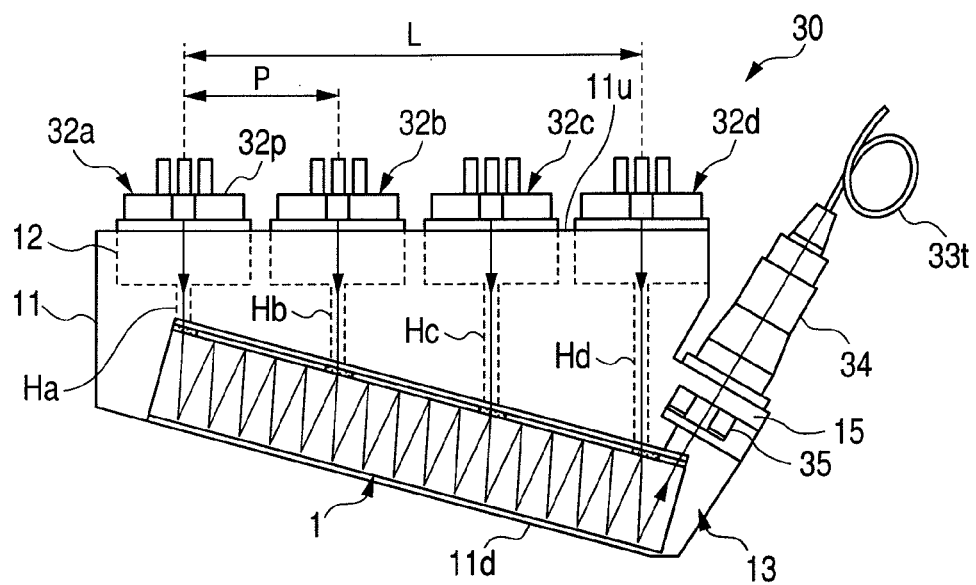
FIG. 4 is a schematic illustration showing a front plan view of the optical module of FIG. 3.

FIG. 3 is a schematic illustration showing a perspective view of an optical module comprising the filter assembly of a first preferred embodiment of the present invention. FIG. 4 is a schematic illustration showing a front plan view of the optical module of FIG. 3. As shown in FIGS. 3 and 4, an optical module 30 is a transmitting optical sub-assembly (TOSA) using plural long wavelength LDs (or an LD module), and is used for an optical transmission section of a LX4 optical transceiver for a four-channel WDM system. Unless otherwise noted, the optical module of the embodiment will be described using an optical transmitter assembly as an example. Note that the invention is not limited to four-channel WDM system.

The optical module 30 includes: four 1.3 μm band distributed feedback (DFB) LDs 32a-32d for converting electrical signals to four optical signals of different wavelength in which the electrical signals are delivered from four transmission lanes formed on an optical transceiver circuit board; and a filter assembly 1 serving as an optical multiplexer for wavelength multiplexing the optical signals outputted from the LDs 32a-32d, which are assembled together in a base 11. The LDs 32a-32d are a general-purpose Can-packaged LD that contains an LD element serving as an optical device within a Can package 32p. To the optical module 30 is connected, via a receptacle 34 having an optical connector, a transmission pigtail fiber 33t for transmitting wavelength multiplexed optical signals outputted from the filter assembly 1. The receptacle 34 is for transmitting wavelength multiplexed optical signals to the transmission pigtail fiber 33t. Between the transmission pigtail fiber 33t and filter assembly 1 is provided an optical isolator 35 for limiting transmission (for blocking any return light) of a wavelength multiplexed optical signal outputted from the filter assembly 1 to the direction from the filter assembly to the fiber.

The base 11 accommodates the four LDs 32a-32d and filter assembly 1 such that the LDs 32a-32d are linearly arranged and faced toward the filter assembly 1, and that the filter assembly 1 is accurately positioned at a predetermined angle with respect to the in-line direction of the LDs 32a-32d. The base 11 is formed in a substantially trapezoidal shape in the front plan view such that the fiber side (the right hand side in FIGS. 3 and 4) is wider than the other. The base 11 is formed so as to have a straight upper face 11u and a lower face lid inclined at a predetermined angle relative to the upper face 11u.

Four Can package receptacles 12 for accommodating the LDs 32a-32d (Can packages 32p) are formed at the upper portion and along the upper face 11u of the base 11. That is, the Can package receptacles 12 are formed for respective ones of the Can packages 32p. The LDs 32a-32d are accommodated in and bonded to, by adhesion or welding, to the respective Can packages 32p with each output port facing downward. At the lower portion of the base 11 is formed an oblique mount 13 for mounting the filter assembly 1 oblique to the in-line direction of the LDs 32a-32d such that output light beams from the LDs 32a-32d are incident on respective ones of later-described optical filters at a predetermined angle. Between the oblique mount 13 and Can package receptacles 12 are formed four optical path guides Ha-Hd, respectively, for communicating the oblique mount 13 and Can package receptacles 12 with each other and for introducing output light signals from the LDs 32a-32d to the filter assembly 1. The optical path guides Ha-Hd are formed in such a manner that the length thereof becomes progressively longer toward the fiber side, as shown in FIG. 4.

The oblique mount 13 has: an upper abutment face 13u for alignment against which the upper face of the filter assembly 1 abuts; an side abutment face 13s for alignment against which one side face (the left side face in FIGS. 3 and 4) of the filter assembly 1 abuts; and an extension 13e extending toward the fiber. And, the oblique mount 13 is formed in such a manner that output light beams from the LDs 32a-32d travel through the optical path guides Ha-Hd respectively and impinge on the upper face of the filter assembly 1 mounted to the oblique mount 13. At an end of the extension 13e on the fiber side is formed an isolator mount 14 for mounting the optical isolator 35 such that the isolator mount 14 has a height lower than the oblique mount 13. In this embodiment, there is provided a step for height alignment in order to allow a wavelength multiplexed optical signal from the filter assembly 1 to properly enter the isolator 35, but no such step is necessary if there is no need of any height alignment. On the fiber side of the isolator mount 14 is formed a receptacle connection 15 for connecting the receptacle 34 thereto.

The base 11 having the above-described structures is manufactured into an integrated unit by, e.g., metal powder injection molding (MIM) using a mold and a metal, which has an excellent YAG laser weldability and has a small thermal expansion coefficient such as SUS. Use of the MIM allows the accurate forming of the abutment faces 13u and 13s provided at the oblique mount 13, thereby enabling high accuracy alignment of the filter assembly 1.

(Structure of Filter Assembly)

Figure 1:
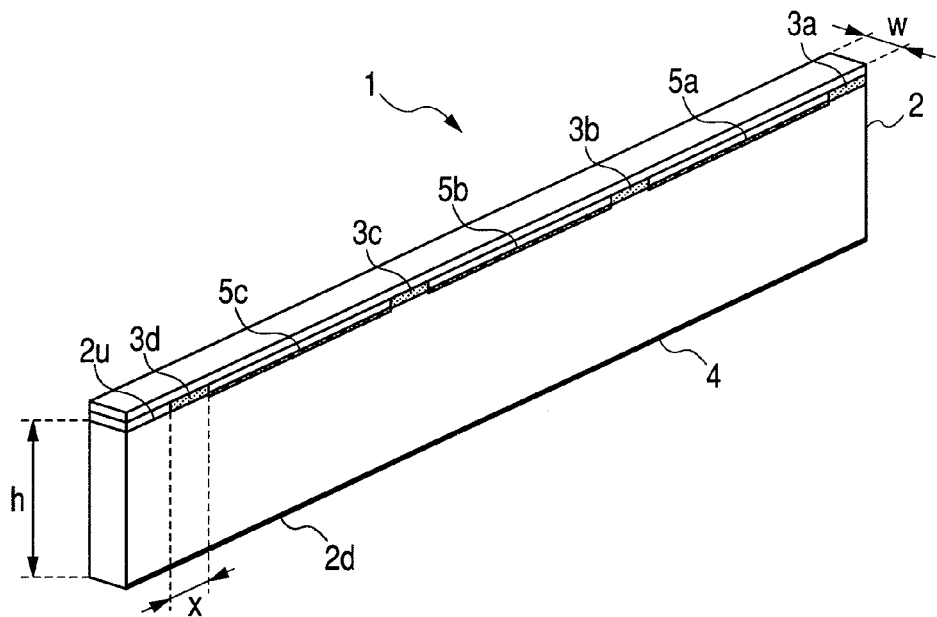
FIG. 1 is a schematic illustration showing a perspective view of a filter assembly according to a first preferred embodiment of the present invention.
Figure 2:
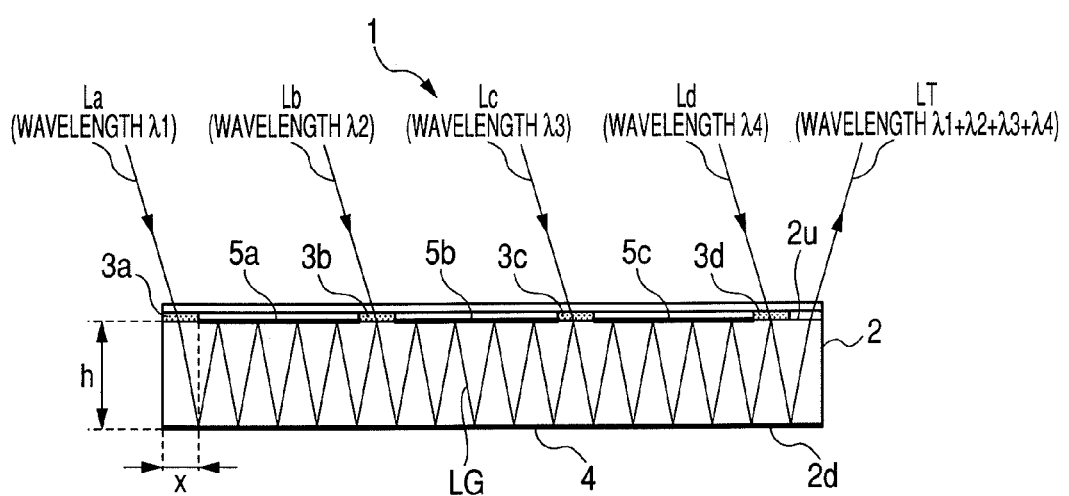
FIG. 2 is a schematic illustration showing a front plan view of the filter assembly of FIG. 1.

FIG. 1 is a schematic illustration showing a perspective view of a filter assembly according to a first preferred embodiment of the present invention. FIG. 2 is a schematic illustration showing a front plan view of the filter assembly of FIG. 1. As shown in FIGS. 1 and 2, the filter assembly 1 according to the first embodiment is an optical multiplexer for combining four different wavelength optical signals from the LDs 32a-32d into a wavelength multiplexed optical signal.

The filter assembly 1 is formed in a long and thin plate shape, and is basically configured in such a manner that four optical filters 3a-3d, through which optical signals La-Ld respectively outputted from the LDs 32a-32d (see FIGS. 3 and 4) enter the filter assembly 1, are arranged with corresponding pitch to a pitch of the LDs 32a-32d on the upper face 2u of a light transmitting member 2 made of a material such as an optical glass. Furthermore, over the entire surface of the lower face 2d thereof is provided a mirror (a lower side reflective layer or a lower side total internal reflection mirror) 4 serving as a total internal reflection face. The optical filters 3a-3d transmit an optical signal within a specific wavelength band that is incident thereon at an angle less than the critical angle for the total internal reflection, while they reflect an optical signal outside the specific wavelength band.

The filter assembly 1 is mounted to the oblique mount 13 in such a manner that optical signals emitted from the LDs 32a-32d are respectively incident on the optical filters 3a-3d within the above-mentioned critical angle; are repeatedly reflected within the filter assembly 1; and propagate along a substantially same optical path LG resulting in a multiplexed optical signal. The filter assembly 1 is inclined at a predetermined angle relative to the upper face 11u of the base 11 so that each of the optical filters 3a-3d of the filter assembly 1 transmits only an optical signal having corresponding specific wavelengths, and the transmitted optical signals enter the light transmitting member 2 to be multiplexed therein while propagating along the same optical path LG.

The optical signals La-Ld of different wavelength emitted from the LDs 32a-32d pass respectively through the optical filters 3a-3d tilted at a predetermined angle relative to the optical path of the optical signals La-Ld, and enter the light transmitting member 2. The height h of the light transmitting member 2 is determined such that the optical signals La-Ld respectively transmitted through the optical filters 3a-3d are intermixed within the light transmitting member 2 to follow the same optical path, and are multiplexed to produce a wavelength multiplexed optical signal LT.

For example, the determination of the height h of the light transmitting member 2 is made so as to satisfy the following conditions. As shown in FIG. 2, when optical signals La-Ld having wavelengths $\lambda 1$-$\lambda 4$ are emitted from the LDs 32a-32d respectively and enter the filter assembly 1, the optical signal La of the wavelength $\lambda 1$ emitted from the LD 32a is incident on the first optical filter 3a at a predetermined angle and propagates within the light transmitting member 2. Here, the optical signal Lb of the wavelength $\lambda 2$ emitted from the LD 32b, which is projected to the second optical filter 3b at the predetermined angle must be multiplexed with the optical signal La and propagates within the light transmitting member 2. Likewise, any following optical signal passing through its corresponding optical filter must follow the same optical path as that of the previously multiplexed optical signal. These conditions also determine the arrangement pitch of the optical filters 3a-3d, or the positions where the optical signals La-Ld are incident on the respective optical filters 3a-3d.

The number of reflections of optical signal propagating within the light transmitting member 2 can be reduced by increasing the height of the light transmitting member 2 to an integer multiple of the height h, such as 2h, 3h and so on. The number of reflections of optical signal and the height of the light transmitting member 2 may be determined according to the specification of an optical transceiver equipped with the optical module 30 shown in FIGS. 3 and 4.

The spaces between adjacent ones of the optical filters 3a-3d at the upper face 2u of the filter assembly 1 are further covered with three inter-filter mirrors of the total internal reflection 5a-5c respectively, which function as upper side reflective layers (inter-filter reflective layers). The optical filters 3a-3d, mirror 4 and inter-filter mirrors 5a-5c may be formed of a laminated multi-layer dielectric film deposited by sputtering or CVD (chemical vapor deposition) in consideration of mechanical strength and adhesiveness to the light transmitting member 2. The mirror 4 and inter-filter mirrors 5a-5c may be also formed of metal having high adhesiveness to the light transmitting member 2 such as Al deposited by vapor deposition. However, a laminated multi-layer dielectric film is more preferable.

(Manufacturing Steps of Filter Assembly)

Figure 5:
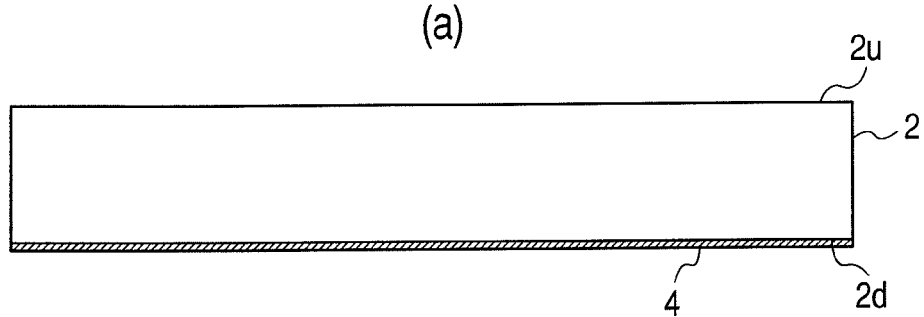
FIGS. 5(a) to 5(c) are schematic illustrations showing front plan views for explaining manufacturing steps of the filter assembly of FIG. 1.
Figure 5:
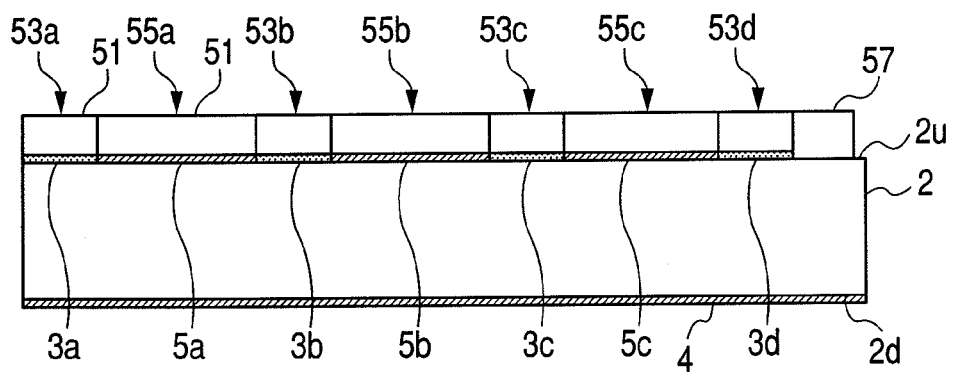
Figure 5:
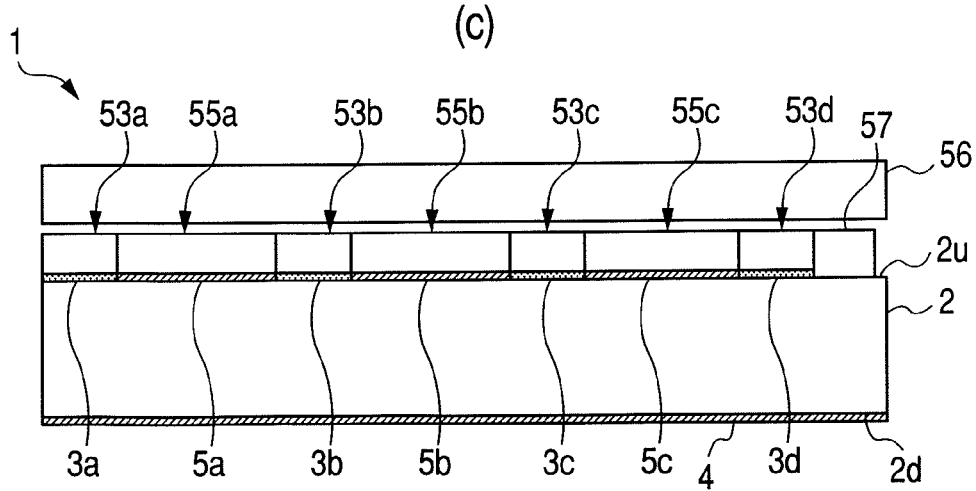

Next, manufacturing steps of the filter assembly 1 will be described with reference to FIGS. 5(a)-5(c). FIGS. 5(a) to 5(c) are schematic illustrations showing front plan views for explaining manufacturing steps of the filter assembly of FIG. 1. The figures are enlarged in the height direction for better understanding.

Firstly, as shown in FIG. 5(a), there is prepared the long and thin plate-shape light transmitting member 2 having a length longer than the distance L between the optical path guides Ha and Hd and shorter than the longitudinal direction (the direction in which the LDs 32a-32d are linearly disposed) of the base 11. And then the mirror 4 is formed over the entire surface of its lower face 2d. Then, each of the optical filters 3a-3d is formed on one face of an optical glass block 51 (for height adjustment) to provide four glass blocks 53a-53d with a filter. Likewise, each of the inter-filter mirrors 5a-5c is formed on one face of an optical glass block 51 to provide three glass blocks 55a-55c with a mirror.

As shown in FIG. 5(b), the glass blocks 53a-53d with a filter, the glass blocks 55a-55c with a mirror and a glass block 57 for height adjustment are secured, by bonding with an adhesive, to the upper face 2u of the light transmitting member 2 with the optical filters 3a-3d and inter-filter mirrors 5a-5c facing downward. At this time, the adhesive used has better to have a refractive index close to that of the optical glass, such as an epoxy-type optical adhesive.

As shown in FIG. 5(c), to the tops of the glass blocks 53a-53d with a filter, glass blocks 55a-55c with a mirror and the glass block 57 for height adjustment, there is further bonded, with an adhesive, a protective optical glass 56 for protecting them. And they are all together pressed against and are secured to the upper face 2u of the light transmitting member 2, thereby obtaining the filter assembly 1.

In this embodiment configuration in which the protective optical glass 56 is provided, the heights of the glass blocks 51, on which the optical filters 3a-3d and inter-filter mirrors 5a-5c are respectively formed, are adjusted such that the glass blocks 53a-53d with a filter and the glass blocks 55a-55c with a mirror all have the same height. The above-described height-adjustment glass block 57 provided on the light transmitting member 2 and having no optical filter or mirror formed thereon can also act to substantially equalize the pressure applied across the protective optical glass 56 and therefore prevent damage thereof.

(Assembling Steps of Optical Module)

Next, assembling steps of the optical module 30 will be described with reference to FIGS. 3 and 4. At first, in assembling the optical module 30 as shown in FIGS. 3 and 4, the filter assembly 1 is mounted on the oblique mount 13 of the base 11 such that the upper face thereof faces the upper face 11u of the base 11.

More specifically, the filter assembly 1 is bonded, with an adhesive or a low melting point glass, to the oblique mount 13 of the base 11, and is positioned in and secured to the base 11 by pushing the left side face of the filter assembly 1 against the side abutment face 13s of the oblique mount 13 while pushing its upper face against the upper abutment face 13u. Thereby, the filter assembly 1 is mounted to the oblique mount 13 of the base 11 oblique to the in-line direction of the LDs 32a-32d so that output light beams from the LDs 32a-32d are incident on the respective optical filters 3a-3d at a predetermined angle.

Further, the LDs 32a-32d are bonded to and contained in the respective Can package receptacles 12, while the optical isolator 35 is mounted to the isolator mount 14 of the base 11. Next the receptacle 34 is connected to the receptacle connection 15, and the transmission pigtail fiber 33t is then connected to the receptacle 34. Finally, a cover (not shown) for protecting the filter assembly 1 is fitted to the base 11, thereby obtaining the optical module 30. The steps of assembling the filter assembly 1, LDs 32a-32d and the others to the base 11 may be performed in any order.

In the first preferred embodiment, the height h of the light transmitting member 2 and the length x and width w of the optical filters 3a-3d are set at 4.1 mm, 1-1.2 mm and 1-2 mm, respectively. And, the arrangement pitch P of the LDs 32a-32d, the angle of incidence of light from air into the glass blocks 51 and the angle of incidence (and therefore the angle of reflection) of light within the light transmitting member 2 are set 7 mm, 15° and 10°, respectively.

(Operation and Advantages of Optical Module According to the Invention)

Next, will be described the operation and advantages of optical module according to the first embodiment of the present invention.

Four transmission electrical signals delivered from a circuit board of the optical transceiver respectively are converted, at the LDs 32a-32d, to the four optical signals La-Ld of different wavelength, which are then transmitted through the respective optical path guides Ha-Hd and enter the filter assembly 1 at a predetermined angle. The description will be made for the case where optical signals La-Ld respectively having wavelengths λ1-λ4 enter the filter assembly 1, as shown in FIGS. 2 and 4. The optical signal La of the wavelength λ1 passes through the first optical filter 3a, experiences multiple reflections (nine reflections in FIGS. 2 and 4) between the mirror 4 and inter-filter mirror 5a, and reaches the second optical filter 3b.

The second optical filter 3b transmits only the optical signal Lb of the wavelength λ2 and reflects the optical signal La of the wavelength λ1, and as a result, the optical signals La and Lb having the respective wavelengths λ1 and λ2 are multiplexed at the exit of the second optical filter 3b to produce a wavelength multiplexed optical signal with wavelengths of λ1 and λ2. Thereafter, similar transmissions and reflections at the optical filters 3c and 3d, multiple reflections between the mirror 4 and inter-filter mirrors 5b and 5c, and then multiplexing of optical signals are performed respectively and sequentially to output, from the right end of the upper face of the filter assembly 1, a wavelength multiplexed optical signal LT created by multiplexing the optical signals La-Ld having the respective wavelengths λ1-λ4. The wavelength multiplexed optical signal LT enters the transmission pigtail fiber 33t through the optical isolator 35 and receptacle 34 to be transmitted to an external transmission path.

The light transmitting member 2, optical filters 3a-3d, mirror 4 and inter-filter mirrors 5a-5c are assembled in the filter assembly 1, or in other words, are integrated in a single integral unit, thereby reducing the number of parts to be managed in mounting the optical filters 3a-3d to the base 11. That is, the operations required for mounting parts to the base 11 can be reduced compared to conventional methods using edge filters. Also, there can be prevented power or sensitivity loss due to filter misalignment or the like in lanes (optical paths between adjacent ones of the optical filters 3a-3d along which respective incident optical signals propagate).

When separately assembling plural edge filters as is conventionally done, the same number of filter mounting planes as that of the filters is required. There is also another problem in that the edge filters are mounted to respective filter mounting portions independently of each other, and are therefore prone to be displaced and misaligned due to thermal expansion of an adhesive used for bonding the filters when the ambient temperature changes. By contrast, in the filter assembly 1, the optical filters 3a-3d are mounted on the upper face 2u of the light transmitting member 2, or in other words, are mounted on a single plane; therefore, even when the ambient temperature changes after alignment, they are less likely to be displaced and misaligned. In addition, they require less amount of assembly work and are easy to assemble and manufacture. Hence, the filter assembly 1 provides high reliability and low cost.

Furthermore, in the filter assembly 1, the optical filters 3a-3d can be readily arranged on the upper face 2u of the light transmitting member 2 according to the arrangement pitch of the LDs 32a-32d and the incident angle of the optical signals La-Ld, thus providing a very flexible choice of the incident angle. This, in turn, provides a flexible design choice of the number of reflections of optical signal and the height h of the light transmitting member 2. Additionally, the optical module 30 according to this embodiment of the present invention has an advantage of being resistant to deformation (camber, bend and twist) because the structure of the base 11 and surroundings of Can package receptacles 12 have a large "second moment of area (area moment of inertia)" (a term known in the material mechanics and structural mechanics arts).

Second Embodiment of the Invention

Figure 6:
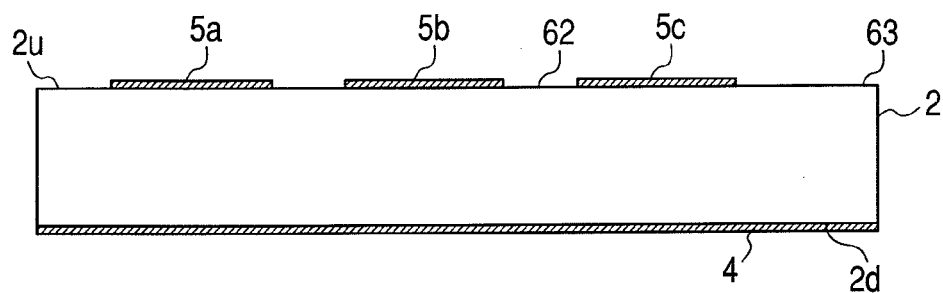
FIGS. 6(a) and 6(b) are schematic illustrations showing front plan views for explaining manufacturing steps of a filter assembly according to a second embodiment of the present invention.
Figure 6:
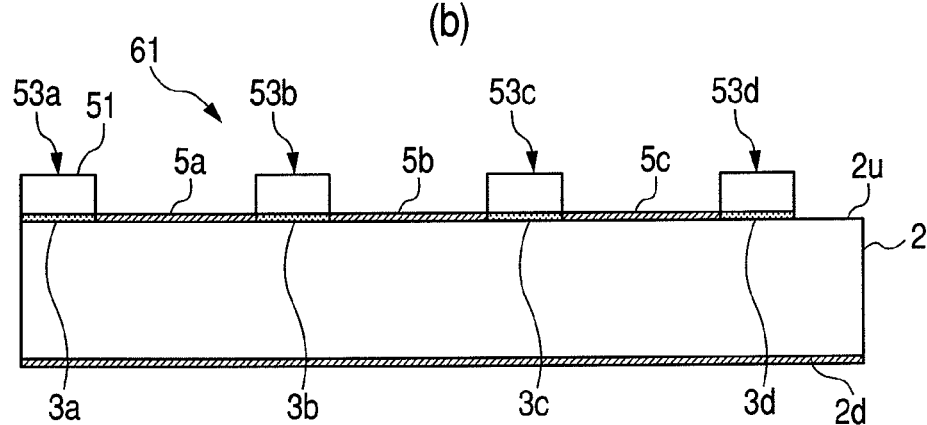

Next, a second embodiment of the present invention will be described with reference to FIGS. 6(a) and 6(b). FIGS. 6(a) and 6(b) are schematic illustrations showing front plan views for explaining manufacturing steps of a filter assembly according to a second embodiment of the present invention. FIG. 6(b) illustrates a filter assembly 61 in which the optical glass blocks 51 having the inter-filter mirrors 5a-5c and the protective optical glass 56 are removed from the filter assembly 1 of FIG. 5(c).

As shown in FIG. 6(a), a long and thin plate-shape light transmitting member 2 is prepared firstly, and then a mirror 4 is formed over the entire surface of its lower face 2d. While, inter-filter mirrors 5a-5c are formed on an upper face 2u of the light transmitting member 2 by masking regions corresponding to filter mounting portions 62 and a light output region 63.

As shown in FIG. 6(b), each of the optical filters 3a-3d is formed on an optical glass block 51 to provide four glass blocks 53a-53d with a filter. The glass blocks 53a-53d with a filter are secured, by bonding with an adhesive, to the respective filter mounting portions 62 on the upper face 2u of the light transmitting member 2 so as to cover the spaces between and outside of the inter-filter mirrors 5a-5c, thereby obtaining the filter assembly 61.

The filter assembly 61 has a smaller number of components than the filter assembly 1, and has a structure in which the inter-filter mirrors 5a-5c, which are uniform with respect to each other, can be accurately and collectively formed on the upper face 2u of the light transmitting member 2, thus providing higher performance, higher reliability and lower cost.

Third Embodiment of the Invention

Figure 7:
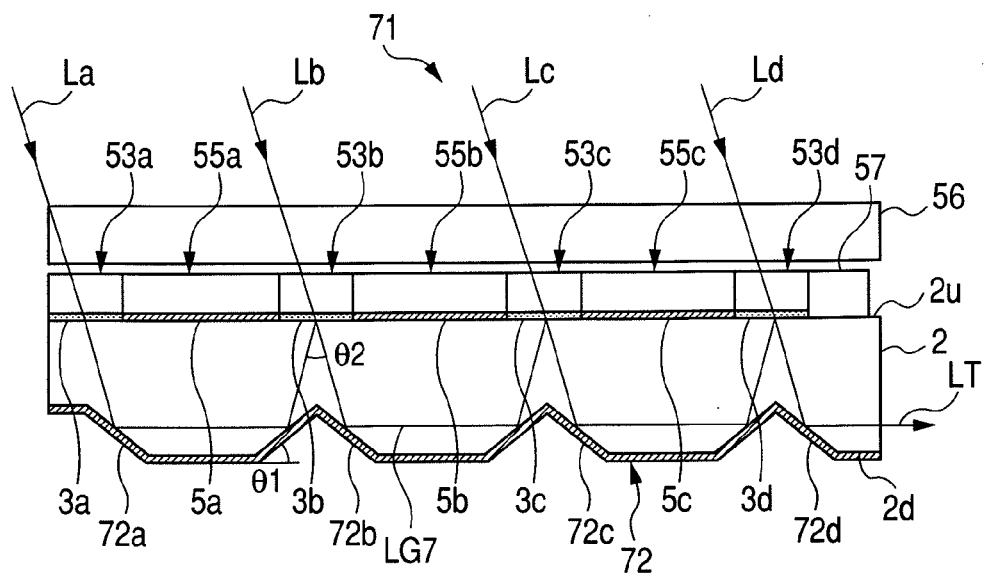
FIG. 7 is a schematic illustration showing a front plan view of a filter assembly according to a third embodiment of the present invention.

Next, a third embodiment of the present invention will be described with reference to FIG. 7. FIG. 7 is a schematic illustration showing a front plan view of a filter assembly according to a third embodiment of the present invention.

In a filter assembly 71, in addition to the structure of the filter assembly 1 of FIG. 5(c), grooves 72a-72d (collectively referred to as grooves 72) are formed at a lower face 2d of a light transmitting member 2 and below respective optical filters 3a-3d in order to provide optical paths being oriented to the in-line direction of the optical filters 3a-3d and being used for transmitting respective incident optical signals La-Ld, as shown in FIG. 7. At least the grooves 72b-72d have angled surfaces on opposite sides thereof in the in-line direction of the optical filters 3a-3d. In this embodiment, the grooves 72b-72d are formed in a V shape.

The angle $\theta 1$ of the angled surfaces of the grooves 72 relative to the lower face 2d of the light transmitting member 2 is greater than the angle of reflection $\theta 2$ relative to the angle of incidence of the optical signals La-Ld and less than 45°. In the third embodiment, the angle $\theta 1$ and angle of reflection $\theta 2$ relative to the angle of incidence were set at 40° and 20°, respectively.

The grooves 72a-72d are formed, e.g., by cutting or etching the lower face 2d of the light transmitting member 2, or by disposing glass blocks of a trapezoidal shape (viewed from the front) on the lower face 2d. A multi-layer dielectric film is then formed over the remaining lower faces 2d and grooves 72a-72d of the light transmitting member 2, thereby obtaining the grooves 72 with a mirror surface.

Within the light transmitting member 2 of the filter assembly 71, optical paths LG7 oriented in the in-line direction of the optical filters 3a-3d, respectively for transmitting the optical signals La-Ld, are formed between adjacent ones of the optical filters, and therefore the total number of reflections within the light transmitting member 2 is smaller (10 reflections of the optical signal La in the FIG. 7 example). Thus, there can be realized a filter assembly 71 capable of reducing light intensity loss due to reflection and having a higher performance. In addition, since the groove 72d is formed on the light output side of the filter assembly 71, a wavelength multiplexed optical signal LT can be laterally outputted from the filter assembly 71 (in the right hand direction in FIG. 7).

On the other hand, another groove having an angled surface only on the side of the previous optical filter 3c may be provided adjacent to the groove 72d on which the wavelength multiplexed optical signal LT is incident and on the side of the light output in order to output the signal LT upwardly from the filter assembly 71 similarly to the filter assembly 1 of FIG. 5(c). Therefore, by providing, on the light output side of the filter assembly 71, a groove having a surface of a predetermined angle only on the side of the groove 72d or the previous optical filter 3c, the position and angle of the exit of the wavelength multiplexed optical signal LT can be chosen as desired, thus providing more flexible mounting to the base 11. Although the groove for reflecting each optical signal has a V shape in the description of this embodiment, it may assume a trapezoidal shape having angled surfaces on opposite sides of the in-line direction of the optical filters.

Fourth Embodiment of the Invention

Figure 8:
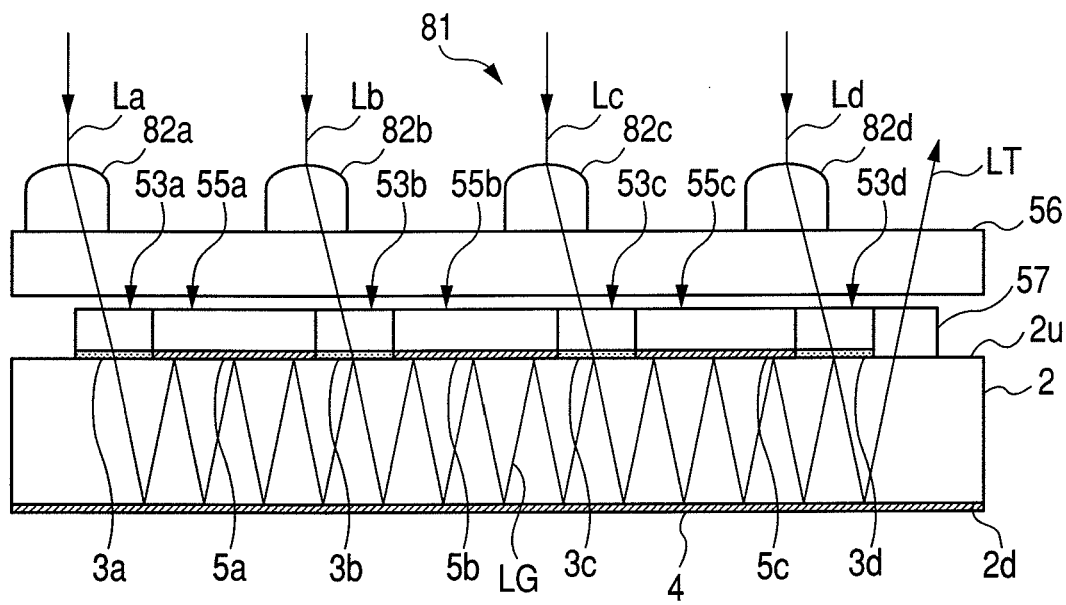
FIG. 8 is a schematic illustration showing a front plan view of a filter assembly according to a fourth embodiment of the present invention.
Figure 9:
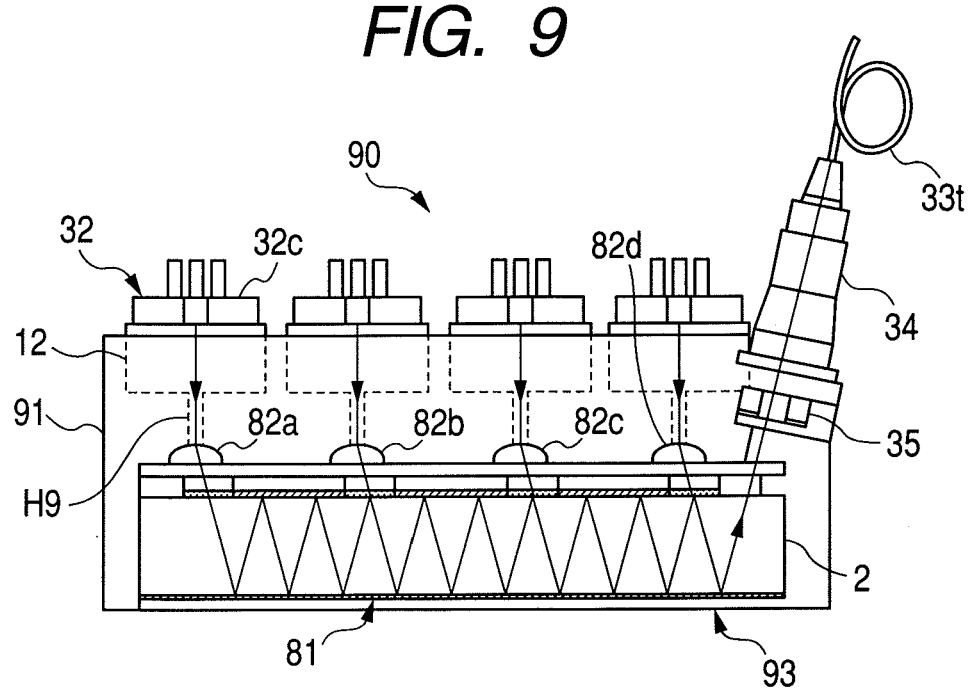
FIG. 9 is a schematic illustration showing a front plan view of an optical module comprising the filter assembly of FIG. 8.

Next, a fourth embodiment of the present invention will be described with reference to FIGS. 8 and 9. FIG. 8 is a schematic illustration showing a front plan view of a filter assembly according to a fourth embodiment of the present invention. FIG. 9 is a schematic illustration showing a front plan view of an optical module comprising the filter assembly of FIG. 8.

In addition to the structure of the filter assembly 1 of FIG. 5(c), a filter assembly 81 has four lenses 82a-82d provided on a protective optical glass 56 above respective optical filters 3a-3d, for collecting optical signals and causing them to be incident on the optical filters 3a-3d, as shown in FIG. 8. The lenses 82a-82d of the filter assembly 81 refract optical signals La-Ld from LDs 32a-32d and condense them on the optical filters 3a-3d respectively, thus eliminating the need of tilting the filter mount and therefore allowing downsizing of the base.

As the base for mounting the filter assembly 81, there can be used, e.g., a base 91 having a rectangular front view shape as shown in FIG. 9. The base 91 has almost the same configuration as the base 11 of FIGS. 3 and 4 except that it has a horizontal mount 93 for mounting the filter assembly 81 in parallel with the in-line direction of the LDs 32a-32d. The optical signals emitted from the LDs 32a-32d are incident on the optical filters 3a-3d at a predetermined angle by the respective lenses 82a-82d. In addition, optical path guides H9 for communicating Can package receptacles 12 and the respective lenses 82a-82d with each other have the same length. The filter assembly 81 is mounted on the horizontal mount 93 having a substantially rectangular front view shape to provide an optical module 90, thus simplifying mounting to optical transceivers and also allowing downsizing of the optical module itself, compared to the optical module 30.

Fifth Embodiment of the Invention

Figure 10:
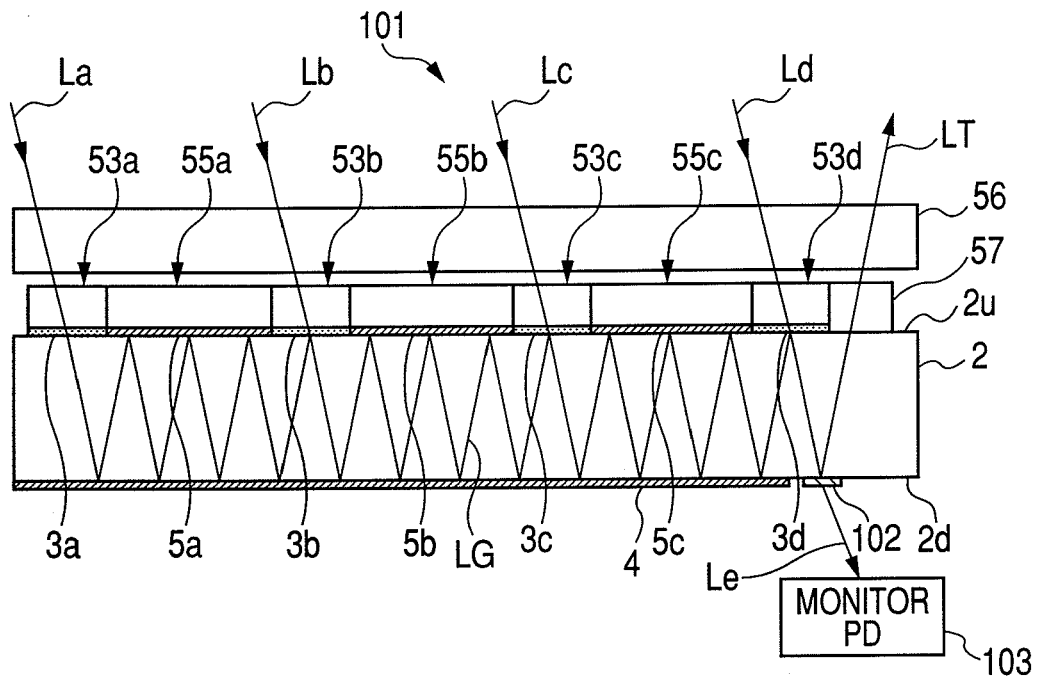
FIG. 10 is a schematic illustration showing a front plan view of a filter assembly according to a fifth embodiment of the present invention.
Figure 11:
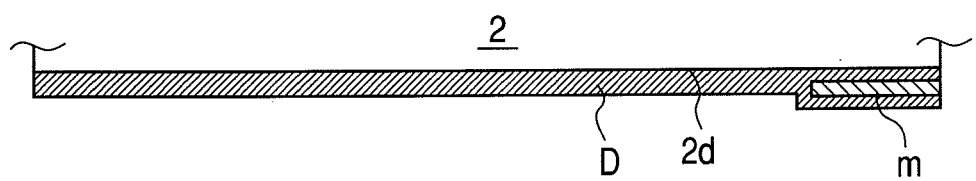
FIGS. 11(a) and 11(b) are schematic illustrations showing front plan views of partially enlarged for explaining manufacturing steps of a variation of the filter assembly of FIG. 10.
Figure 11:
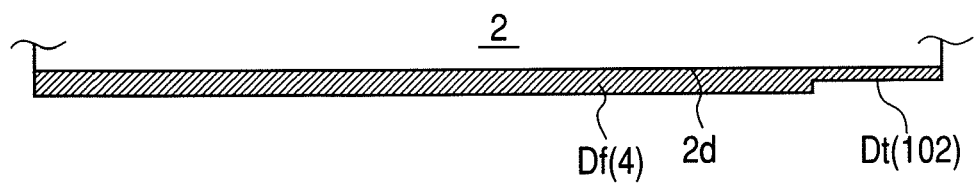

Next, a fifth embodiment of the present invention will be described with reference to FIGS. 10, 11(a) and 11(b). FIG. 10 is a schematic illustration showing a front plan view of a filter assembly according to a fifth embodiment of the present invention. FIGS. 11(a) and 11(b) are schematic illustrations showing front plan views of partially enlarged for explaining manufacturing steps of a variation of the filter assembly of FIG. 10.

As shown in a filter assembly 101 of FIG. 10, a half mirror 102 is provided in part of a mirror 4 on which the optical signal LT is incident for transmitting part of a wavelength multiplexed optical signal LT. Below the half mirror 102 is provided a monitor PD 103 for receiving a transmitted optical signal Le passing through the half mirror 102 to monitor the optical signal LT. The half mirror 102 preferably transmits no more than 10% of the output of the optical signal LT. Additionally, the half mirror 102 is preferably formed of a multi-layer dielectric film.

When using a multi-layer dielectric film as the half mirror 102, a first multi-layer dielectric film D with a relatively thinner thickness is formed on the entire surface of the lower face 2d of a light transmitting member 2 and then a mask metal film m is formed on a portion of the first multi-layer dielectric film D on the light output side. Thereafter a second multi-layer dielectric film D is formed on the metal mask film m and first multi-layer dielectric film D, as shown in FIG. 11(a). Then, only the metal mask film m and second multi-layer dielectric film D formed thereon are removed by etching as shown in FIG. 11(b), of which the thicker portion Df of the multi-layer dielectric film can be used as the mirror 4 and the thinner portion Dt as the half mirror 102. The thickness of the multi-layer dielectric film Dt used as the half mirror 102 can be appropriately determined depending on the wavelengths and transmissivity of an optical signal to be transmitted.

The monitor PD 103 of the filter assembly 101 receives the transmitted optical signal Le passing through the half mirror 102 to monitor the wavelength multiplexed optical signal LT, which can thereby be increased or decreased on the basis of the monitored signal. Hence, the filter assembly 101 of this embodiment has an advantage such that the wavelength multiplexed optical signal LT can be controlled to a desired output power.

Sixth Embodiment of the Invention

Figure 12:
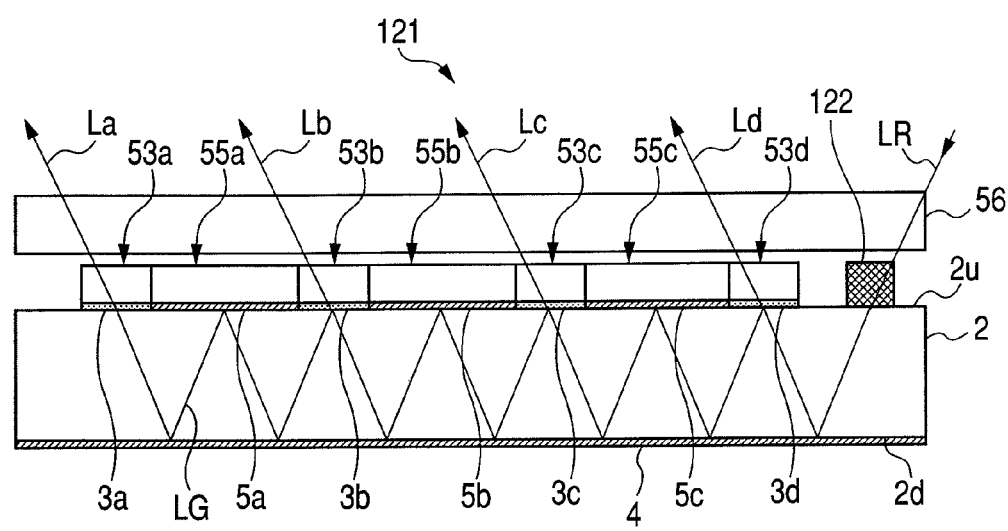
FIG. 12 is a schematic illustration showing a front plan view of a filter assembly according to a sixth embodiment of the present invention.

Next, a sixth embodiment of the present invention will be described with reference to FIG. 12. FIG. 12 is a schematic illustration showing a front plan view of a filter assembly according to a sixth embodiment of the present invention.

As shown in FIG. 12, a filter assembly 121 is used in an optical receiver assembly of an optical module. This optical receiver assembly wavelength demultiplexes a wavelength multiplexed optical signal to optical signals of different wavelength and includes optical devices for receiving light. The filter assembly 121 has a P or S polarizing plate 122 for transmitting either P-polarized or S-polarized light contained in a wavelength multiplexed optical signal LR (similar to the wavelength multiplexed optical signal LT but having a different symbol for distinction) on an upper face 2u of an light transmitting member 2 on which the optical signal LR is incident.

The wavelength multiplexed optical signal LR consists of P-polarized and S-polarized light. The reflectances of the P-polarized and S-polarized light are substantially the same up to an incident angle of approximately 10°, but come to greatly differ from each other with increasing incident angle above approximately 10°. In the filter assembly 121, the wavelength multiplexed optical signal LR passes through the P or S polarizing plate 122 to remove either P-polarized or S-polarized light, thereby allowing an optical signal LR containing only P-polarized or S-polarized light to enter the filter assembly 121.

Therefore, the incident angle of light to the filter assembly 121 can be chosen larger than that to the filter assembly 1 of FIG. 5(c) (it may be, e.g., approximately 30°), and therefore, the total number of optical signal reflections within the light transmitting member 2 can be reduced (13 reflections of an optical signal La in the FIG. 12 example). Thus, there can be realized a filter assembly 121 for wavelength demultiplexing capable of reducing light intensity loss due to reflection and having a higher performance.

Seventh Embodiment of the Invention

Figure 13:
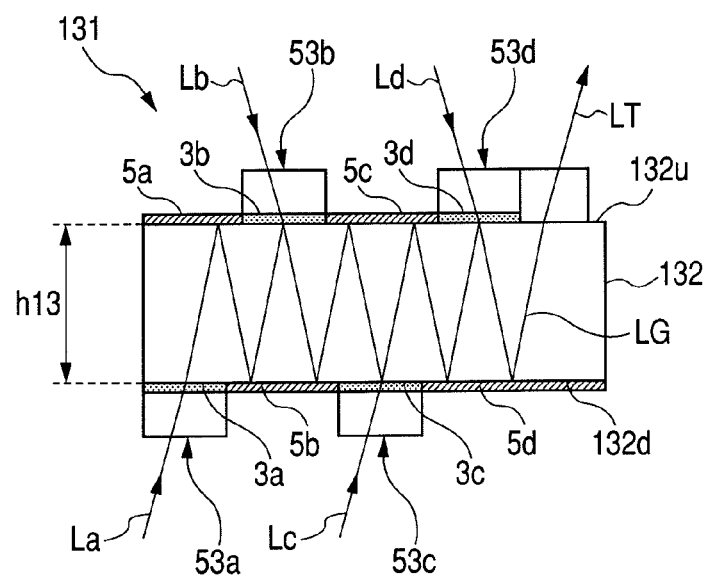
FIG. 13 is a schematic illustration showing a front plan view of a filter assembly according to a seventh embodiment of the present invention.

Next, a seventh embodiment of the present invention will be described with reference to FIG. 13. FIG. 13 is a schematic illustration showing a front plan view of a filter assembly according to a seventh embodiment of the present invention.

As shown in FIG. 13, in a filter assembly 131, optical filters 3a-3d transmitting respective optical signals from LDs 32a-32d are alternately disposed on upper and lower faces 132u and 132d of a light transmitting member 132 at a predetermined spacing in the longitudinal direction (the lateral direction in the figure) of the member 132. Further, in the filter assembly 131, inter-filter mirrors 5a and 5c are provided between and outside of the optical filters 3b and 3d, while inter-filter mirrors 5b and 5d are provided between and outside of the optical filters 3a and 3c.

The height h13 of the light transmitting member 132 of the filter assembly 131 is set so that optical signals La-Ld incident on and transmitting the respective optical filters 3a-3d experience reflections within the light transmitting member 132 and follow the same optical path to produce a wavelength multiplexed optical signal LT. In the filter assembly 131, the optical filters 3a-3d are alternately disposed on the opposite faces of the light transmitting member 132 at a predetermined spacing in the longitudinal direction of the member 132, so that the entire space for mounting the optical filters can be reduced and therefore the filter assembly 131 can be further downsized compared to the filter assembly 1 of FIG. 5(c).

When configuring an optical transmitter assembly using the filter assembly 131, the optical transmitter assembly and a circuit board mounted in an optical transceiver are preferably connected to each other via a flexible board. Although the filter assemblies of the above embodiments have been described as having the four optical filters 3a-3d, any number of optical filters may be used. While the filter assemblies according to the first to fifth and seventh embodiments have been described as being used in an optical transmitter assembly of an optical module, the configurations thereof can also be used in an optical receiver assembly of an optical module.

When used in an optical receiver assembly: a wavelength multiplexed optical signal is inputted from the light output side of the above filter assemblies; and four PDs for converting optical signals passing through the respective optical filters 3a-3d into electrical signals are used in place of the LDs 32a-32d of the above optical modules, thereby enabling the above-described filter assemblies or optical modules to function inversely. In this case, the four optical filters 3a-3d serve to demultiplex (wavelength separate) a four-channel wavelength multiplexed optical signal to four optical signals.

Thus, the above-described filter assemblies can function as an optical multiplexer as well as an optical demultiplexer, and therefore can be used not only for an optical transmitter assembly of an optical module but also for an optical receiver assembly. Furthermore, in the above embodiments, each base (e.g., bases 11 and 91) for mounting the filter assembly can be used for both optical transmitter and receiver assemblies, and therefore only one mold is required for fabricating respective bases 11 and 91 for transmitter and receiver use. Hence, the filter assemblies according to the embodiments of the present invention can reduce parts cost and facilitate parts management. Additionally, the above-described filter assemblies may be used in combination.

Eighth Embodiment of the Invention

Figure 14:
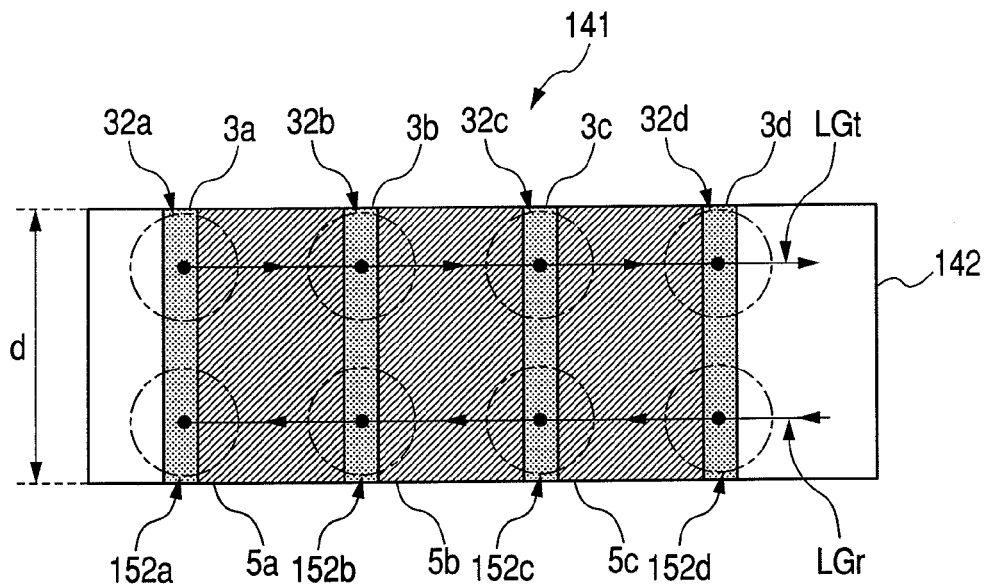
FIG. 14 is a schematic illustration showing an upper side plan view of a filter assembly according to an eighth embodiment of the present invention.
Figure 15:
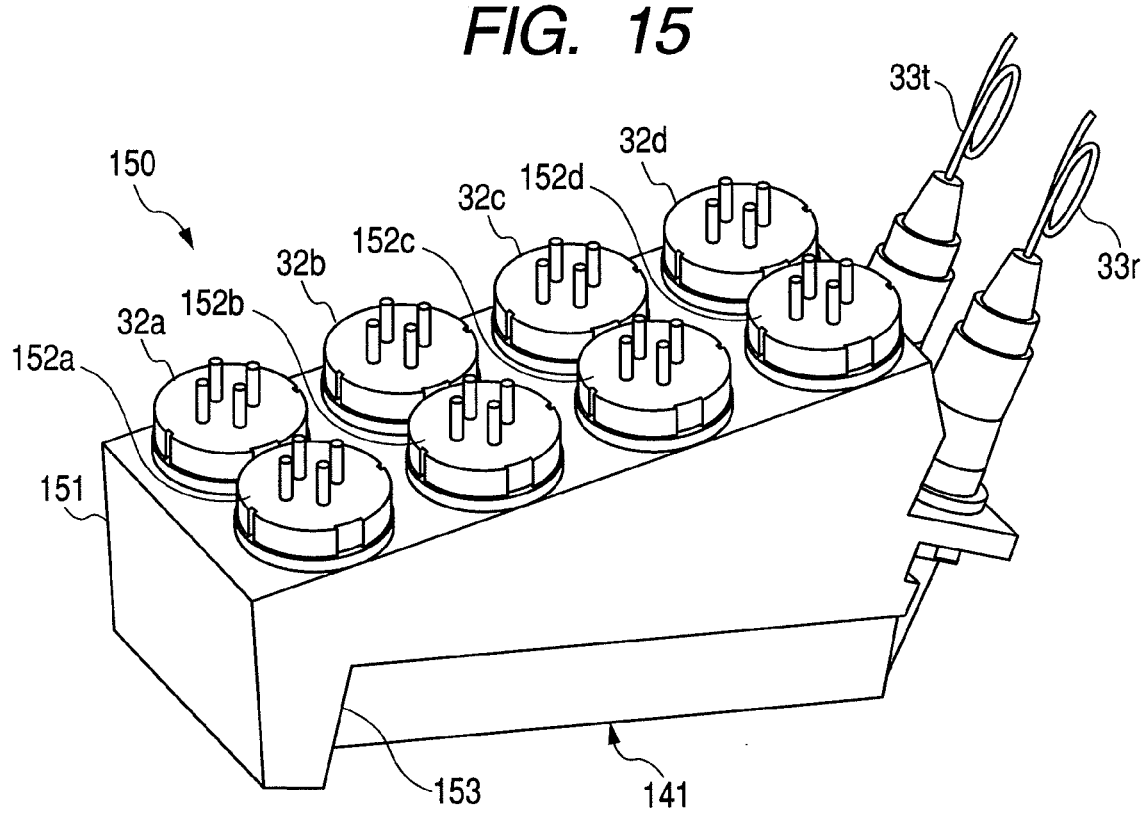
FIG. 15 is a schematic illustration showing a perspective view of an optical module comprising the filter assembly of FIG. 14.

Next, an eighth embodiment of the present invention will be described with reference to FIGS. 14 and 15. FIG. 14 is a schematic illustration showing an upper side plan view of a filter assembly according to an eighth embodiment of the present invention. FIG. 15 is a schematic illustration showing a perspective view of an optical module comprising the filter assembly of FIG. 14.

As shown in FIG. 14, in a filter assembly 141, there are disposed in parallel: an optical path LGt for wavelength multiplexing (for transmission) formed at one side (the upper side of FIG. 14) of a light transmitting member 142 in its thickness direction (the vertical direction of FIG. 14); and an optical path LGr for wavelength division (for reception) formed at the other side (the lower side of FIG. 14). And, optical filters 3a-3d and inter-filter mirrors 5a-5c serving as a reflective layer as described above are provided across the optical paths LGt and LGr. The thickness of the light transmitting member 142 is set to be greater than at least a distance between the parallel optical paths LGt and LGr, preferably twice greater than that. For example, the thickness d of the light transmitting member 142 is approximately 7 mm, preferably approximately 14 mm when using a ϕ5.6 mm Can package for containing LDs 32a-32d and PDs 152a-152d. Also, when using a ϕ3.8 mm Can package, the thickness d of the light transmitting member 142 is approximately 4 mm, preferably approximately 8 mm.

The filter assembly 141 is mounted to a base 151 as shown in FIG. 15. The base 151 has a thickness approximately twice that of the base 11 of FIGS. 3 and 4, and has an almost similar configuration to the base 11 except that it is provided with one oblique mount 153, eight Can package receptacles and two receptacle connections. A transmission pigtail fiber 33t and reception pigtail fiber 33r are connected to the respective receptacle connections of the base 151, while two parallel rows respectively of four LDs 32a-32d and four PDs 152a-152d are accommodated at an upper portion of the base 151, thereby configuring an optical transmission/reception assembly 150 for an optical module.

The filter assembly 141 can share the same optical system for both transmission and reception; therefore, the filter assembly 141 only needs to be mounted to the oblique mount 153 of the base 151 in order to provide, with the single filter assembly 141, the optical transmission/reception assembly 150 which mounts both optical transmission and reception assemblies for an optical module.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A filter assembly for combining a wavelength multiplexed optical signal by multiplexing optical signals of different wavelength emitted from respective optical devices, and/or for dividing a wavelength multiplexed optical signal into optical signals of different wavelength and causing the optical signals of different wavelength to enter respective optical devices, wherein the filter assembly comprises:
 a light transmitting member within which each optical signal propagates;
 a lower reflective layer provided on a lower face of the light transmitting member and being in contact with the lower face, the lower reflective layer being formed over an entire surface of the lower face;
 upper reflective layers respectively being provided on and in contact with an upper face of the light transmitting member, the upper reflective layers being formed by masking regions corresponding to filter mounting portions provided at a predetermined pitch; and
 a plurality of glass blocks of a parallelepiped shape each of which having an optical filter, each of the plurality of the optical filters being formed on each of the entire face of each of the plurality of the glass blocks, each of a plurality of optical filters on the glass block facing the upper face of the light transmitting member and being disposed on and in a contact with the upper face of the light transmitting member by bonding with adhesive so as to cover the respective filter mounting portions, and wherein: each optical signal passes through only one of the plurality of optical filters and is reflected by the other of the plurality of optical filters;

between adjacent ones of the plurality of optical filters, the each optical signal experiences multiple reflections by the lower reflective layer and the upper reflective layer; and the wavelength multiplexed optical signal propagates along the same optical path within the tight transmitting member, wherein the filter assembly further comprising:

a plurality of glass blocks each of which having one of said upper reflective layers on lower face thereof facing the upper face of the light transmitting member; and a protective optical glass provided on tops of the plurality of glass blocks having the optical filter and the plurality of glass blocks having the upper reflective layer.

2. The filter assembly according to claim 1 further comprising a half mirror for transmitting part of the wavelength multiplexed optical signal, wherein:

the half mirror is disposed in place of a portion of the lower reflective layer on which the wavelength multiplexed optical signal is incident either after multiplexing or before demultiplexing.

3. The filter assembly according to claim 1, wherein:

there are two optical paths formed in parallel in the light transmitting member, one optical path being for wavelength multiplexing, the other optical path being for wavelength demultiplexing;

said two parallel optical paths are formed side by side, an optical path for wavelength multiplexing being formed on one side of the light transmitting member in its thickness direction, and an optical path for wavelength separation being formed on the other side thereof; and each optical filter and each reflective layer are provided across both the optical paths.

4. The filter assembly according to claim 1 further comprising a P or S polarizing plate respectively for transmitting P-polarized or S-polarized light contained in the wavelength multiplexed optical signal, wherein the P or S polarizing plate is provided at the upper face of the light transmitting member on which the wavelength multiplexed optical signal is incident.

5. An optical module, including:

a plurality of optical devices for converting an electrical signal into an optical signal and/or a plurality of optical devices for converting an optical signal into an electrical signal;

a filter assembly; and a base housing the plurality of optical devices and the filter assembly, the plurality of optical devices being linearly arranged and faced toward the filter assembly, wherein: all of the optical devices are general-purpose Can-packaged devices, each contains a laser diode element or a photodiode element within a Can package, wherein the filter assembly comprises:

a light transmitting member within which each optical signal propagates;

a lower reflective layer provided on an entire surface of a lower face of the light transmitting member and being in contact with the lower face;

upper reflective layers respectively being provided on and in contact with an upper face of the light transmitting member, excluding filter mounting portions provided at a predetermined pitch on the upper face, the predetermined pitch being more than a diameter of the general-purpose Can-packaged device; and a plurality of glass blocks of a parallelepiped shape each of which having an optical filter on one entire face thereof, each of a plurality of the optical filters on the glass block facing the upper face of the light transmitting member and being disposed on and in a contact with the upper face of the light transmitting member so as to cover the respective filter mounting portions, and wherein: each optical signal passes through only one of the plurality of optical filters and is reflected by the other of the plurality of optical filters;

between adjacent ones of the optical filters, the each optical signal experiences multiple reflections by the lower reflective layer and the upper reflective layer; and the wavelength multiplexed optical signal propagates along the same optical path within the light transmitting member, wherein the filter assembly further comprises:

a plurality of glass blocks each of which having said upper reflective layer on lower face thereof facing the upper face of the light transmitting member; and a protective optical glass provided on tops of the plurality of glass blocks having the optical filter and the plurality of glass blocks having the upper reflective layer.

6. The filter assembly according to claim 1 further comprising a plurality of lenses, wherein each of the plurality of lenses is provided on the protective optical glass above respective optical filters, for collecting optical signals and causing them to be incident on the optical filters.

7. The optical module according to claim 5, wherein, the filter assembly further comprises a half mirror for transmitting part of the wavelength multiplexed optical signal; and the half mirror is disposed in place of a portion of the lower reflective layer on which the wavelength multiplexed optical signal is incident either after multiplexing or before demultiplexing.

8. The optical module according to claim 5, wherein, in the base, there are provided two rows of the plurality of optical devices, one row consisting of the optical devices for converting an electrical signal into an optical signal, the other row consisting of the optical devices for converting an optical signal into an electrical signal, the two rows being formed in parallel and side by side each other, and wherein, in the light transmitting member of the filter assembly, there are two optical paths formed in parallel, one optical path being for wavelength multiplexing, the other optical path being for wavelength demultiplexing;

said two parallel optical paths are formed side by side, an optical path for wavelength multiplexing being formed on one side of the light transmitting member in its thickness direction, an optical path for wavelength separation being formed on the other side thereof; and each optical filter and each reflective layer are provided across both the optical paths.

9. The optical module according to claim 5, wherein, the filter assembly further comprises a P or S polarizing plate respectively for transmitting P-polarized or S-polarized light contained in the wavelength multiplexed optical signal; and the P or S polarizing plate is provided at the upper face of the light transmitting member on which the wavelength multiplexed optical signal is incident.

10. The optical module according to claim 5,
wherein, the filter assembly further comprises a plurality of lenses; and
each of the plurality of lenses is provided on the protective optical glass above respective optical filters, for collecting optical signals and causing them to be incident on the optical filters.

11. A filter assembly for combining a wavelength multiplexed optical signal by multiplexing optical signals of different wavelength emitted from respective optical devices, and/or for dividing a wavelength multiplexed optical signal into optical signals of different wavelength and causing the optical signals of different wavelengths to enter respective optical devices, all of the optical devices emitting or receiving optical signals being general-purpose Can-packaged devices each of which contains a laser diode element or a photodiode element within a Can package, wherein the filter assembly comprises:
  a light transmitting member within which each optical signal propagates;
  a lower reflective layer provided on an entire surface of a lower face of the light transmitting member and being in contact with the lower face;
  upper reflective layers respectively being provided on and in contact with an upper face of the light transmitting member, excluding filter mounting portions provided at a predetermined pitch on the upper face, the predetermined pitch being more than a diameter of the general-purpose Can-packaged device; and
  a plurality of glass blocks of a parallelepiped shape each of which having an optical filter on one entire face thereof, each of a plurality of the optical filters on the glass block facing the upper face of the light transmitting member and being disposed on and in a contact with the upper face of the light transmitting member so as to cover the respective filter mounting portions,
  and wherein, each optical signal passes through only one of the plurality of optical filters and is reflected by the other of the plurality of optical filters;
  between adjacent ones of the optical filters, the each optical signal experiences multiple reflections by the lower reflective layer and the upper reflective layer; and
  the wavelength multiplexed optical signal propagates along the same optical path within the light transmitting member,
wherein the filter assembly further comprises:
  a plurality of glass blocks each of which having said upper reflective layer on lower face thereof facing the upper face of the light transmitting member; and
  a protective optical glass provided on tops of the plurality of glass blocks having the optical filter and the plurality of glass blocks having the upper reflective layer.

* * * * *